United States Patent
Wakamatsu

(10) Patent No.: US 9,298,402 B2
(45) Date of Patent: Mar. 29, 2016

(54) PRINT MANAGEMENT APPARATUS, NON-TRANSITORY RECORDING MEDIUM, AND PRINTING SYSTEM

(71) Applicant: FUJI XEROX CO., LTD., Minato-ku, Tokyo (JP)

(72) Inventor: Jun Wakamatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/271,098

(22) Filed: May 6, 2014

(65) Prior Publication Data
US 2015/0092218 A1 Apr. 2, 2015

(30) Foreign Application Priority Data

Oct. 2, 2013 (JP) .................. 2013-207577
Oct. 4, 2013 (JP) .................. 2013-208862

(51) Int. Cl.
*G06F 3/12* (2006.01)
*G06K 15/00* (2006.01)
*G06F 9/46* (2006.01)

(52) U.S. Cl.
CPC .............. *G06F 3/121* (2013.01); *G06F 3/124* (2013.01); *G06F 3/126* (2013.01); *G06F 3/1211* (2013.01); *G06F 3/1261* (2013.01); *G06F 3/1288* (2013.01); *G06F 2206/1514* (2013.01)

(58) Field of Classification Search
CPC ... G06F 3/1203; G06F 3/1204; G06F 3/1205; G06F 3/1226; G06F 3/1234; G06F 3/1235; G06F 3/1244; G06F 3/1245; G06F 3/1246; G06F 3/1247; G06F 3/1248; G06F 3/1259; G06F 3/1261; G06F 3/1285; H04N 1/00233; H04N 1/32545; H04N 1/32609; H04N 1/32625

USPC .............. 358/1.11–1.18, 400–404, 1.9, 2.1; 399/8–37; 709/201–203; 710/8–19

See application file for complete search history.

(56) References Cited

U.S. PATENT DOCUMENTS 4,994,926 A 2/1991 Gordon et al.
5,126,786 A 6/1992 Tanaka
(Continued)

FOREIGN PATENT DOCUMENTS

JP 02-120066 A 5/1990
JP 08-221233 A 8/1996
(Continued)

OTHER PUBLICATIONS

Office Action (Patent Examination Report) dated Apr. 9, 2015, issued by the Australian Patent Office in counterpart Australian Application No. 2014202961.

(Continued)

*Primary Examiner* — Chad Dickerson
(74) *Attorney, Agent, or Firm* — Sughrue Mion, PLLC

(57) ABSTRACT

Provided is a print management apparatus including a failure detector that detects a failure of a printing control apparatus and a printing apparatus in a printing system, and a printing continuation control unit that performs a control for requesting, when the failure detector detects the failure of any one of the printing control apparatus and the printing apparatus, an another printing system to lend an apparatus corresponding to the apparatus of which the failure is detected among the printing control apparatus and the printing apparatus, and for continuing, when the apparatus that is a request target is lent in response to the request, printing by the lent apparatus instead of the apparatus of which the failure is detected.

12 Claims, 12 Drawing Sheets

(56) References Cited

U.S. PATENT DOCUMENTS

| | | | |
|---|---|---|---|
| 5,625,757 A * | 4/1997 | Kageyama | G06F 3/1207 358/1.14 |
| 2002/0048476 A1 | 4/2002 | Kato | |
| 2002/0105675 A1* | 8/2002 | Toyofuku | G06F 3/121 358/1.15 |
| 2003/0103236 A1* | 6/2003 | Kato | G06F 3/1204 358/1.15 |
| 2004/0184061 A1 | 9/2004 | Christiansen | |
| 2004/0190042 A1* | 9/2004 | Ferlitsch | H04N 1/00233 358/1.15 |
| 2005/0213144 A1* | 9/2005 | Uejo | G06F 3/1206 358/1.15 |
| 2011/0075165 A1* | 3/2011 | Hayakawa | G06F 3/1211 358/1.9 |
| 2013/0070294 A1 | 3/2013 | Mochizuki | |
| 2015/0092217 A1* | 4/2015 | Fukui | G06F 3/121 358/1.14 |

FOREIGN PATENT DOCUMENTS

| | | |
|---|---|---|
| JP | 2004192507 A | 7/2004 |
| JP | 2009-026231 A | 2/2009 |
| JP | 2011-070337 A | 4/2011 |

OTHER PUBLICATIONS

Office Action (Patent Examination Report) dated Apr. 1, 2015, issued by the Australian Patent Office in counterpart Australian Application No. 2014202960.

* cited by examiner

FIG. 3

| APPARATUS ID | APPARATUS TYPE | ADDRESS FOR COMMUNICATION |
|---|---|---|
| D001 | MANAGEMENT APPARATUS | 192.168.0.1 |
| D002 | INTERPRETER | 192.168.0.2 |
| D003 | PRINTING CONTROL APPARATUS | 192.168.0.3 |
| D004 | INTERPRETER | 192.168.0.4 |
| D005 | INTERPRETER | 192.168.0.5 |
| D006 | MANAGEMENT APPARATUS | 192.168.0.6 |
| D007 | INTERPRETER | 192.168.0.7 |
|  |  |  |

FIG. 4

| SYSTEM ID | MANAGEMENT APPARATUS | INTERPRETER | PRINTING CONTROL APPARATUS |
|---|---|---|---|
| S01 | D001 | D002, D004, D005 | D003 |
| S02 | D006 | D007, D008, .... | D011, D012 |
| S03 | D020 | D021 | D022 |
|  |  |  |  |

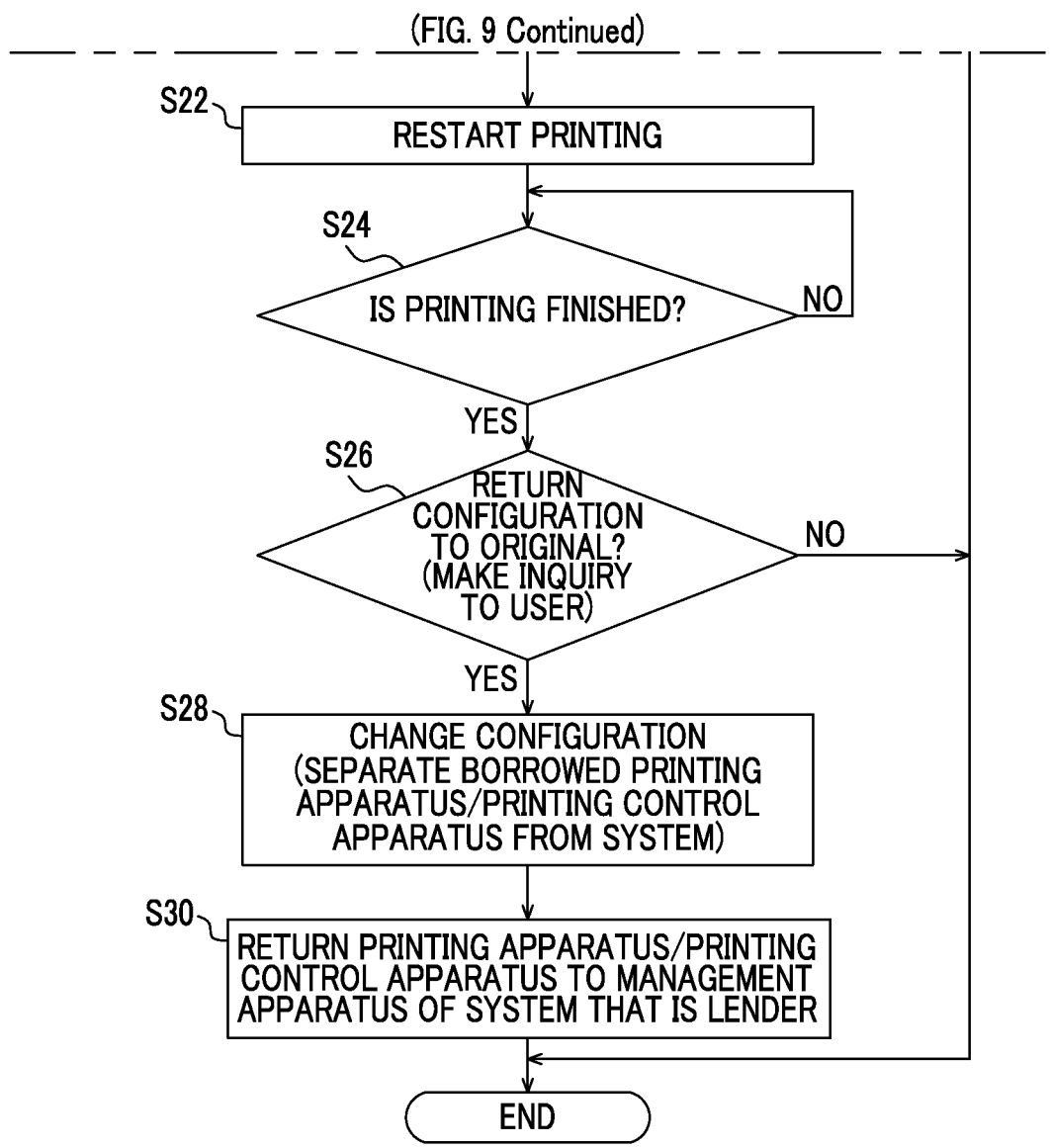

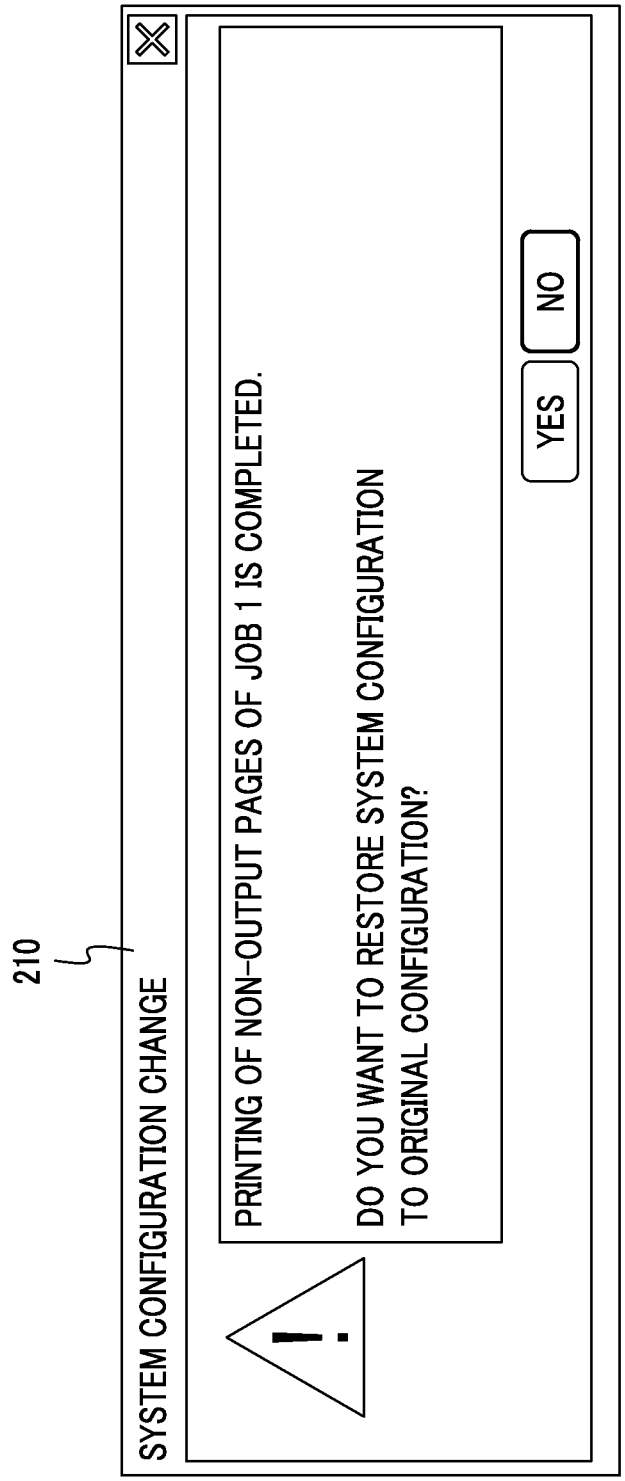

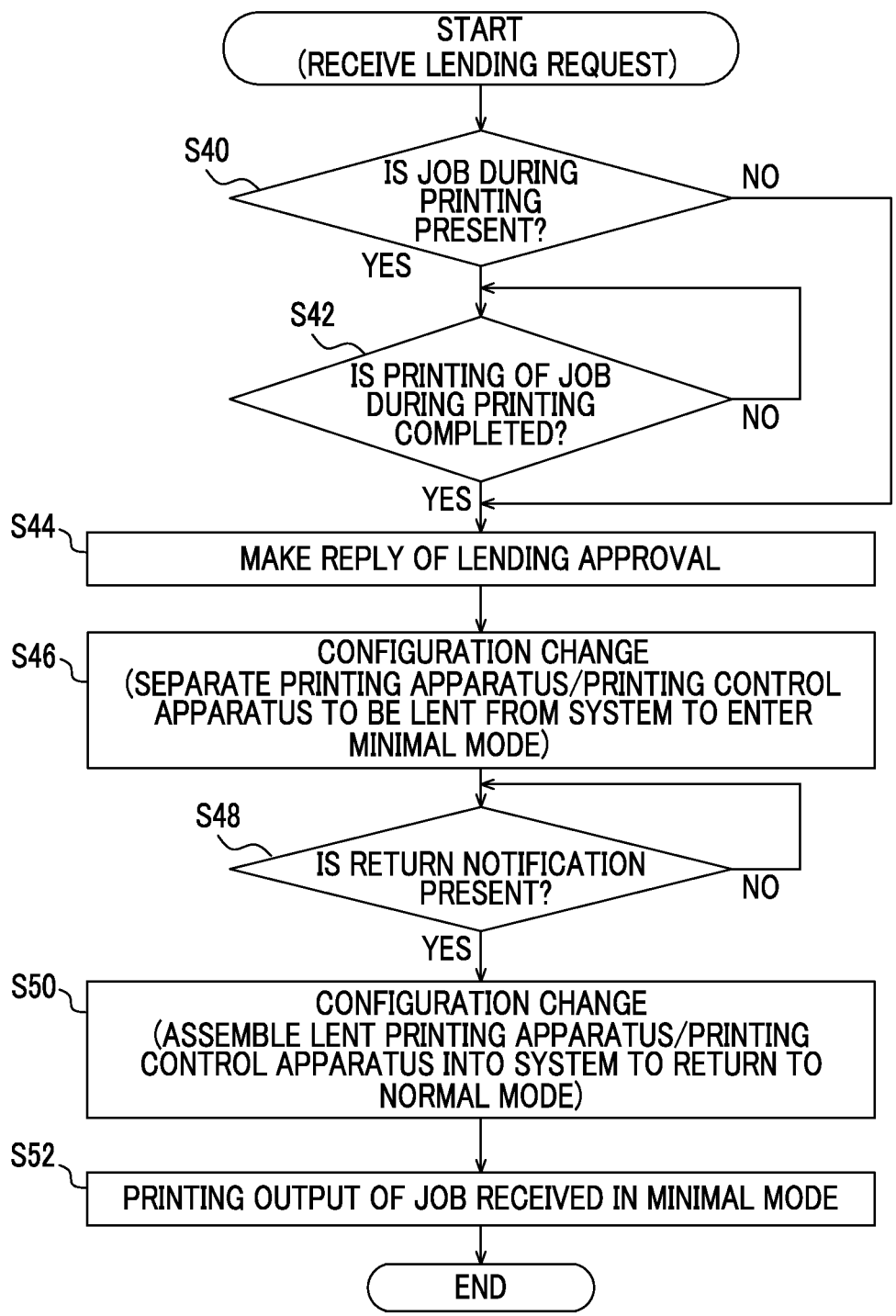

PRINT MANAGEMENT APPARATUS, NON-TRANSITORY RECORDING MEDIUM, AND PRINTING SYSTEM

CROSS-REFERENCE TO RELATED APPLICATIONS

This application is based on and claims priority under 35 USC 119 from Japanese Patent Application Nos. 2013-207577 filed Oct. 2, 2013 and 2013-208862 filed Oct. 4, 2013.

BACKGROUND

Technical Field

The present invention relates to a print management apparatus, a non-transitory recording medium, and a printing system.

SUMMARY

According to an aspect of the invention, there is provided a print management apparatus including:

a failure detector that detects a failure of a printing control apparatus and a printing apparatus in a printing system; and a printing continuation control unit that performs a control for requesting, when the failure detector detects the failure of any one of the printing control apparatus and the printing apparatus, an another printing system to lend an apparatus corresponding to the apparatus of which the failure is detected among the printing control apparatus and the printing apparatus, and for continuing, when the apparatus that is a request target is lent in response to the request, printing by the lent apparatus instead of the apparatus of which the failure is detected.

BRIEF DESCRIPTION OF THE DRAWINGS

Exemplary embodiments of the present invention will be described in detail based on the following figures, wherein:

FIG. 3 is a diagram describing an example of data contents of apparatus management information;

FIG. 4 is a diagram describing an example of data contents of printing system management information;

Figure 5:
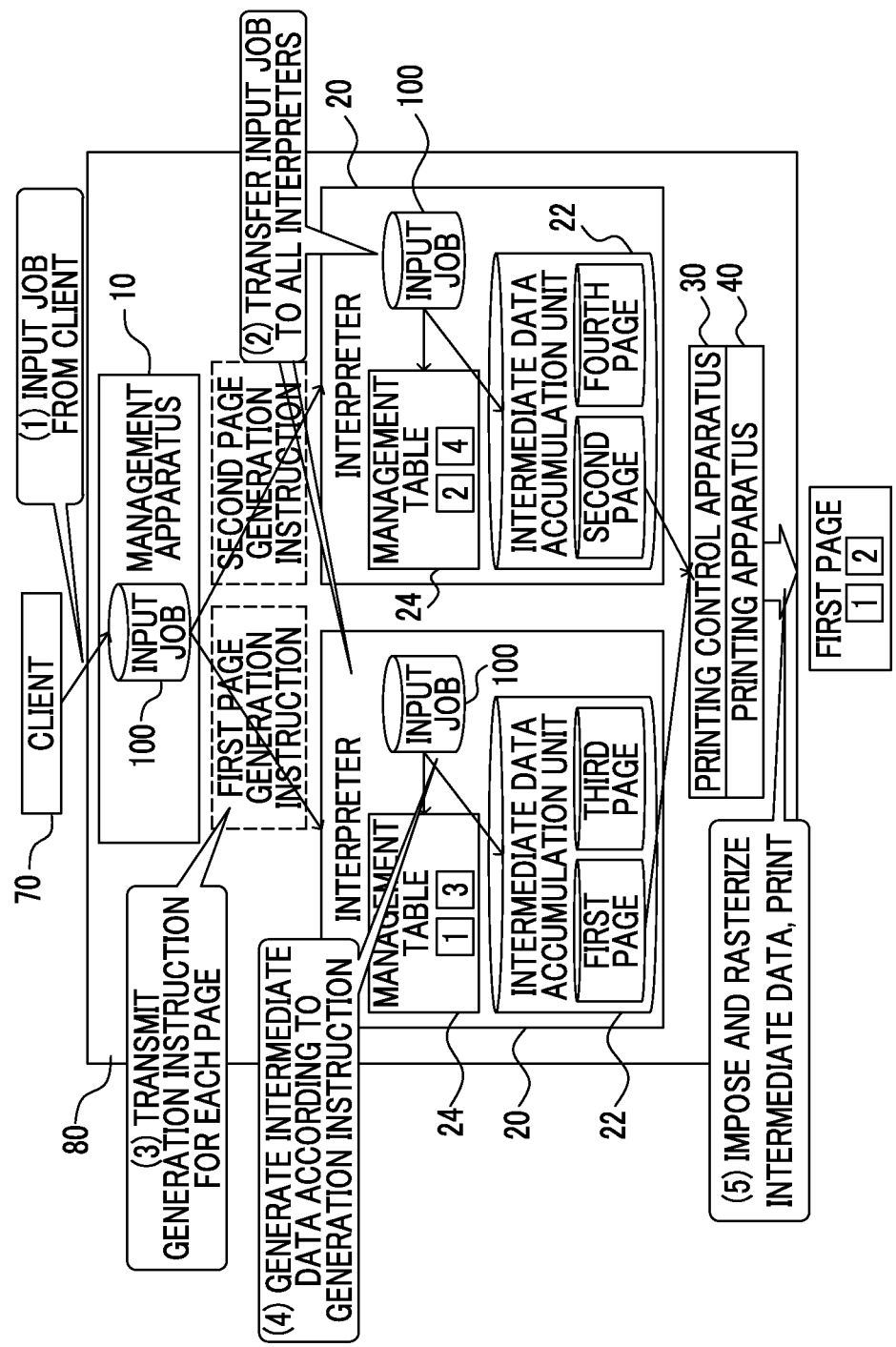
FIG. 5 is a diagram describing a flow of a normal print process in the printing system to which the control of the exemplary embodiment is applied.
Figure 6:
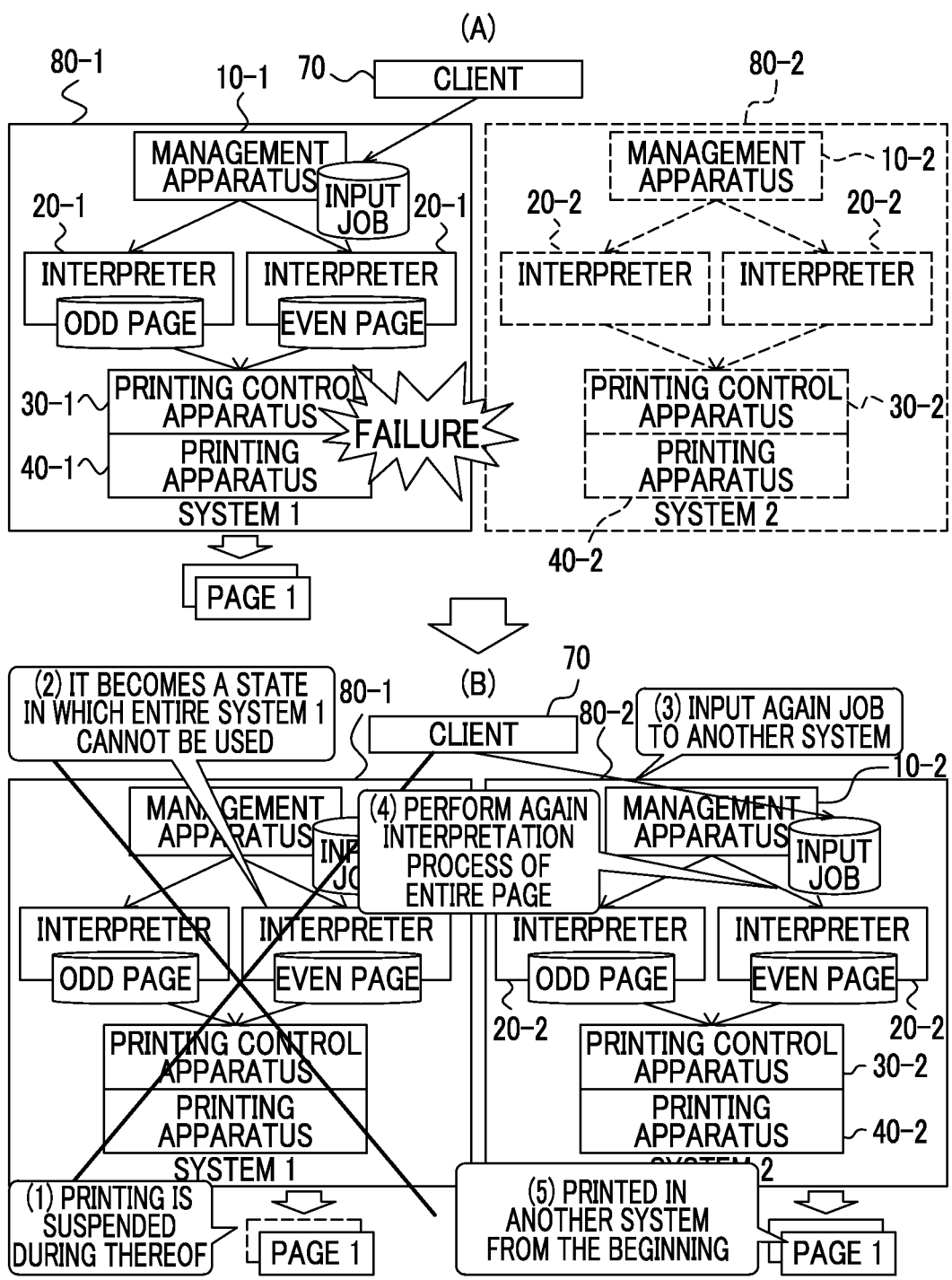
Figure 7:
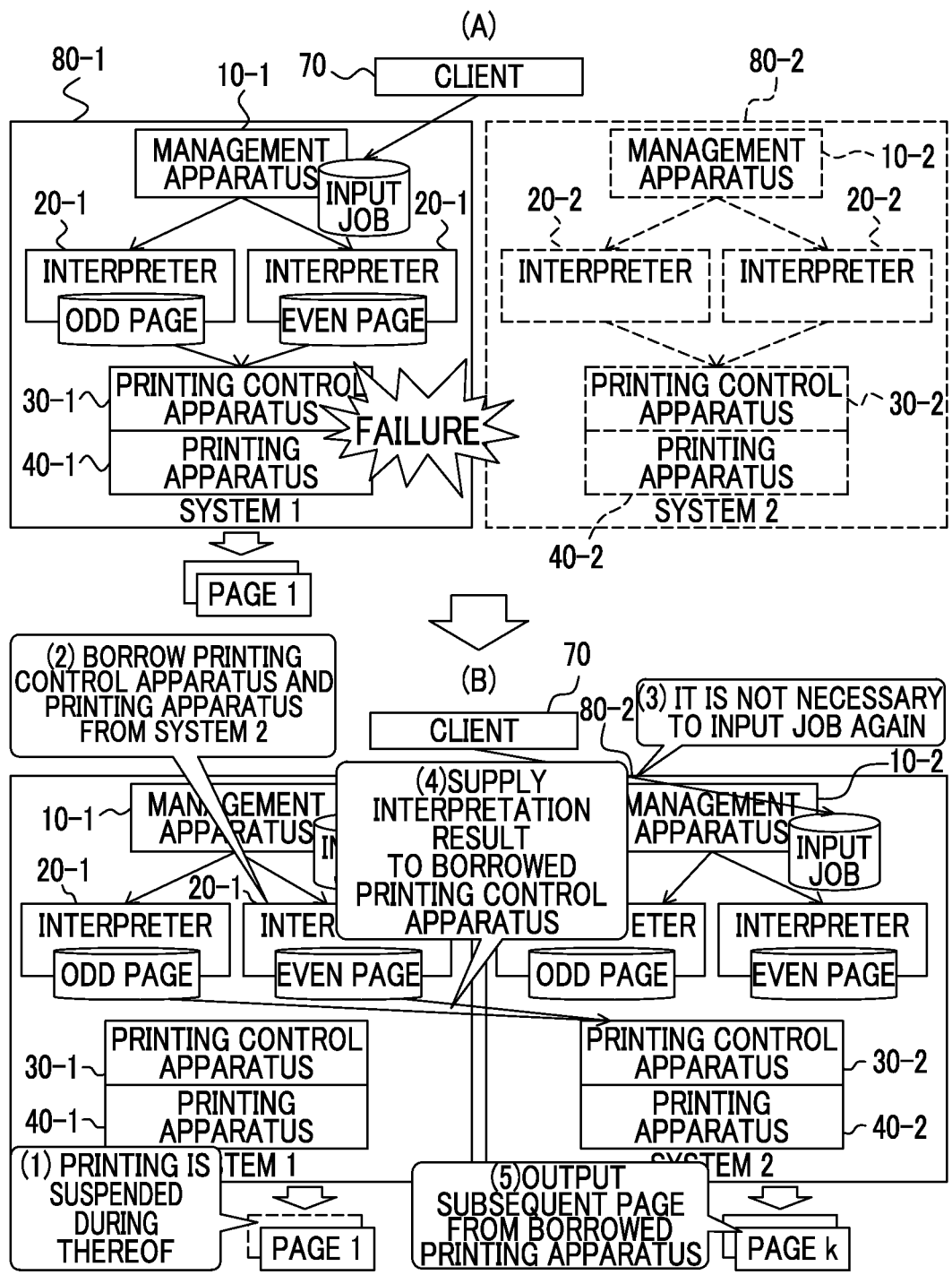
Figure 8:
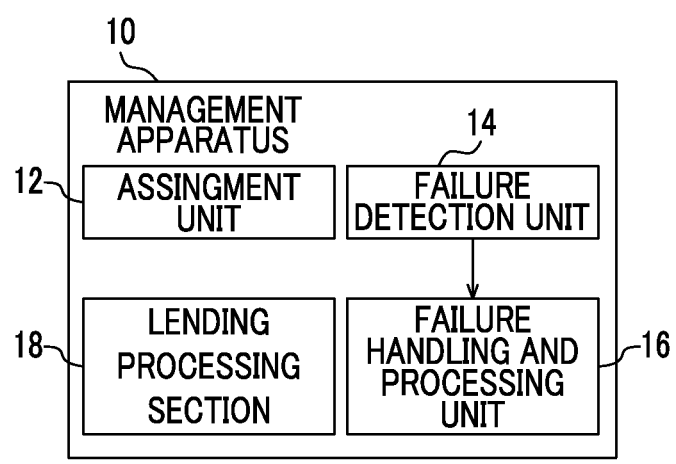
Figure 9:
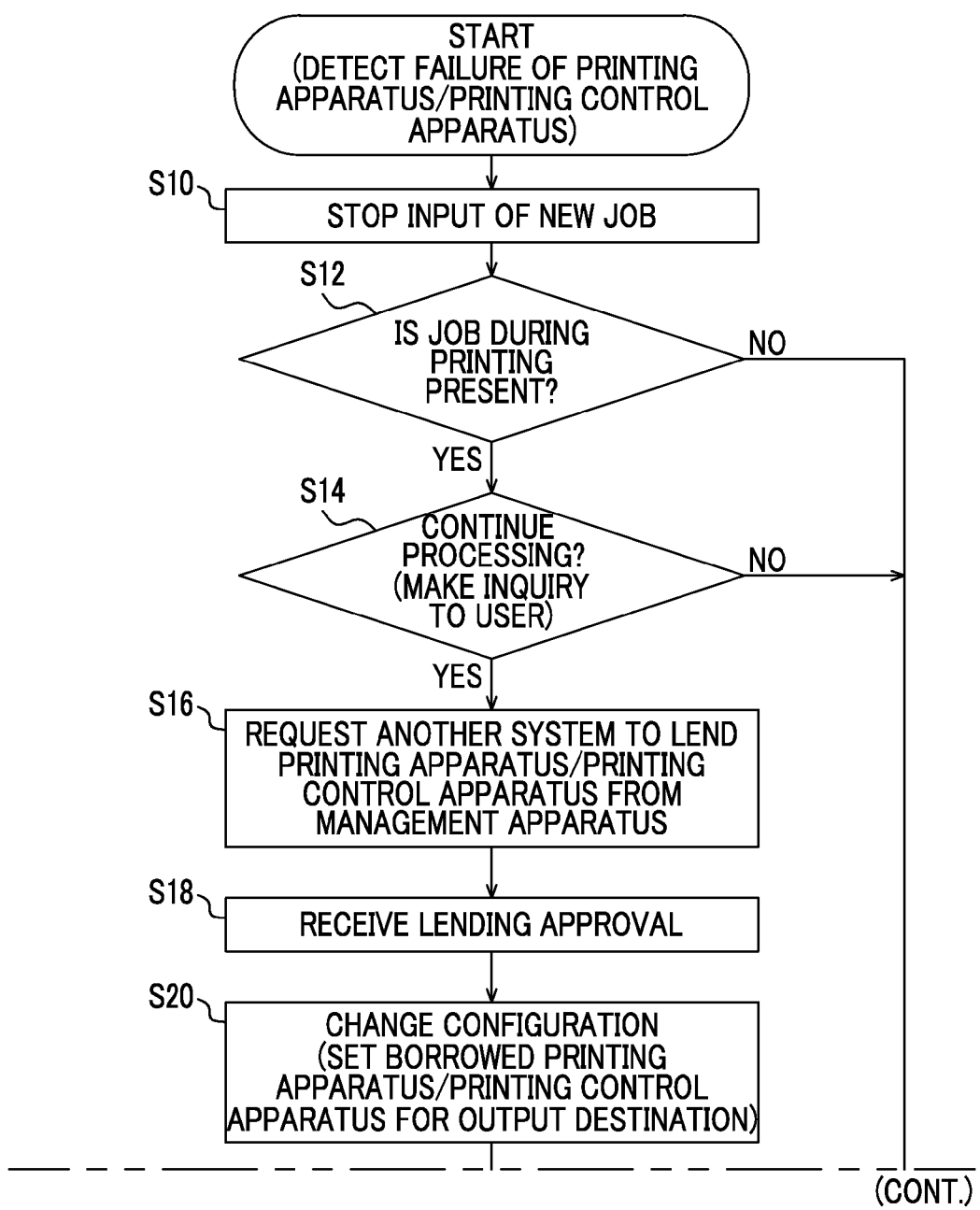
Figure 10:
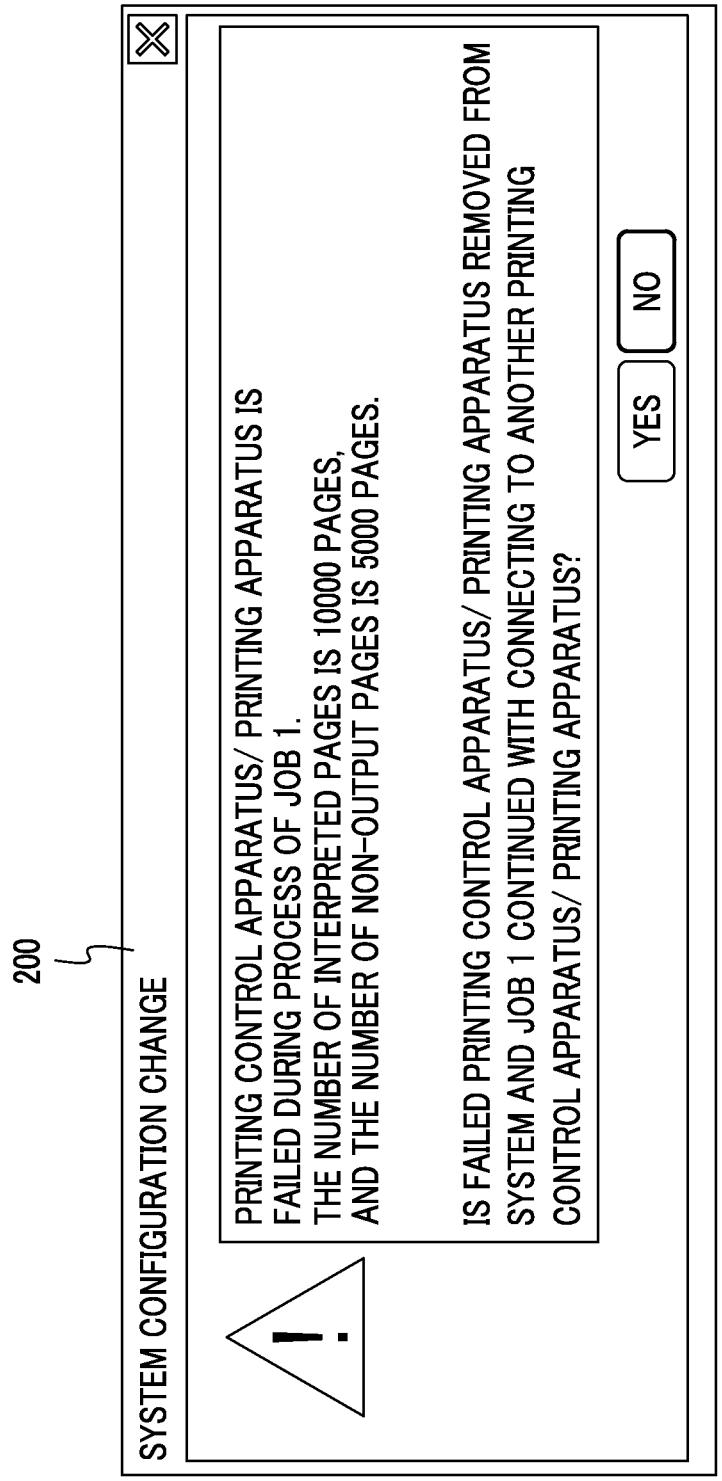

(A) of FIG. 6 and (B) of FIG. 6 are diagrams describing a system behavior in the related art when one interpreter fails, in the printing system shown in FIG. 5;

(A) of FIG. 7 and (B) of FIG. 7 are diagrams describing a system behavior in the present exemplary embodiment when a printing control apparatus or a printing apparatus is failed;

FIG. 8 is a diagram showing an example of a functional configuration of a management apparatus in the present exemplary embodiment;

FIG. 9 is a diagram showing an example of a processing procedure of the management apparatus when a certain interpreter in the printing system is failed;

FIG. 10 is a diagram schematically showing an example of an inquiry screen used for inquiring of a user whether to perform a rescue process at the time of detection of a failure;

FIG. 11 is a diagram schematically illustrating an example of an inquiry screen used for asking whether to return a printing control apparatus and a printing apparatus that are borrowed when a print output of a print job that is already received when a failure occurs is finished; and FIG. 12 is a diagram illustrating an example of a processing procedure of a management apparatus that receives a lending request of a printing control apparatus and a printing apparatus from a printing system where a failure occurs.

DETAILED DESCRIPTION

Figure 1:
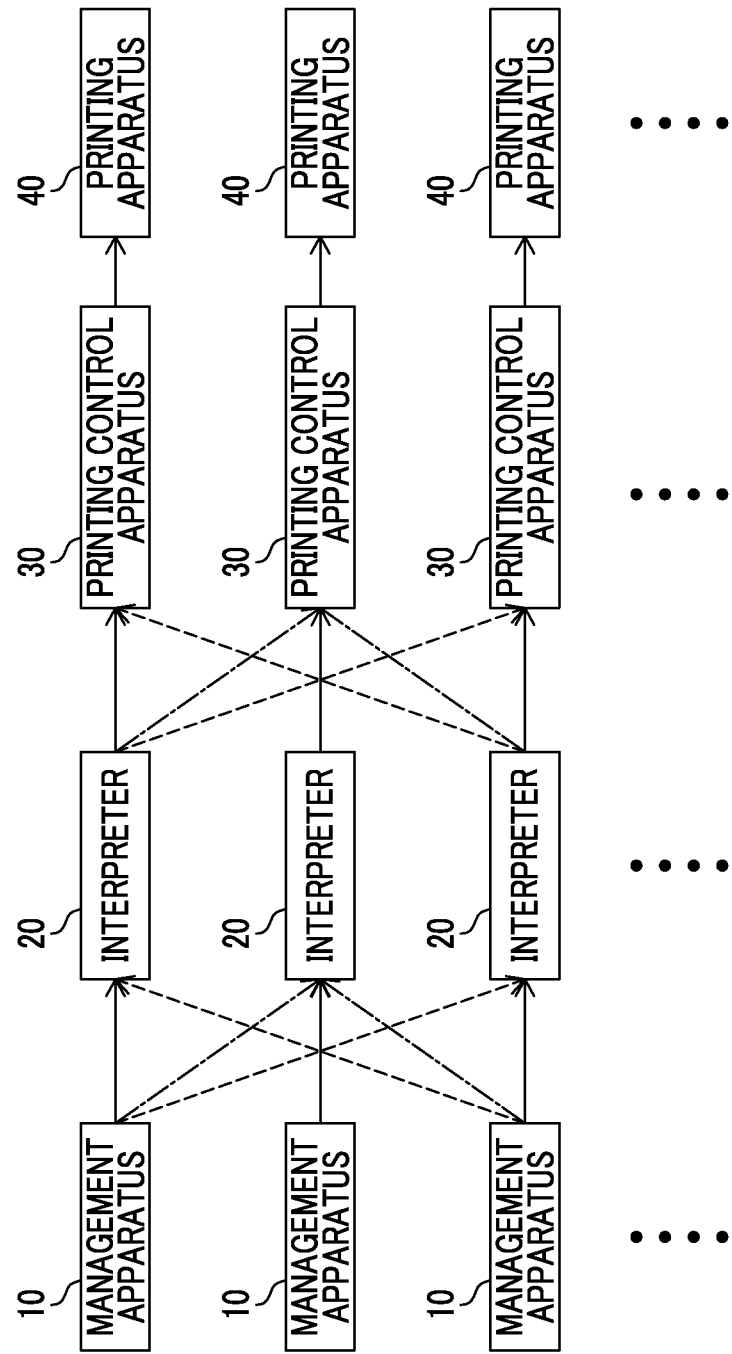
FIG. 1 is a diagram describing a printing system to which control of an exemplary embodiment is applied.

Referring to FIG. 1, an overview of a functional configuration of a system to which control according to an exemplary embodiment is applied will be described.

A printing system of the present exemplary embodiment is configured to include one management apparatus 10, one or more interpreters 20, one or more printing control apparatuses 30, and one or more printing apparatuses 40. In other words, one management apparatus 10 manages one or more interpreters 20, one or more printing control apparatuses 30, and one or more printing apparatuses 40 under its own control so as to configure one printing system. For configuring the printing system, the user may select how to combine the management apparatus 10, the interpreter 20, the printing control apparatus 30, and the printing apparatus 40. As shown in FIG. 1, in an environment in which plural management apparatuses 10 are present, the printing systems of a maximum of the same number as the number of the management apparatuses 10 are configurable.

What is shown in FIG. 1 is, for example, so to speak, a super system provided in one office. The user combines components (the management apparatus 10, the interpreter 20, the printing control apparatus 30, and the printing apparatus 40) in the super system, thereby building one or more printing systems in accordance to the purpose. Further, it is possible to change the configuration of each printing system in response to an addition or a removal of components and a change in circumstances.

Next, respective components will be described.

The management apparatus 10 receives a print job from a client computer (not shown) and a portable recording medium, and controls the interpreter 20, the printing control apparatus 30, and the printing apparatus 40 under the control of its own so as to execute the print job (printing). Here, the print job is a print instruction from the user including print data in which an image of each page of a document of an object to be printed is written in a Page Description Language (hereinafter, abbreviated as "PDL").

The management apparatus 10 includes a job management function for managing an execution order of a print job group transmitted from various users.

Further, the management apparatus 10 transmits print data to the interpreter 20 in the same printing system so as to be processed. In a configuration in which plural interpreters 20 are present in the printing system, the management apparatus 10 assigns, for example, different pages within the print data to each interpreter 20 and causes the plural interpreters 20 to perform interpretation processes of the plural pages in parallel.

The interpreter 20 interprets the PDL description of print data received from the management apparatus 10, and generates intermediate data representing the image of each page represented by print data, in response to the result of the interpretation.

The intermediate data is data having a data format of an intermediate size between PDL data generated by a client and print image data of a data format capable of being handled by the printing apparatus 40 (for example, a raster format). The intermediate data format subdivides the image object described in, for example, the PDL into small elements of a simple shape so as to be expressed. As the intermediate data format, for example, a display list format is known. Further, another example of the intermediate data format includes those described in JP-A-2011-150535 by the present applicant and disclosed in the specification of Japanese Application 2013-129948 by the present applicant. As the interpretation process performed by the interpreter 20, those known in the related art may be used, so that the description thereof will be omitted.

The interpreter 20 generates intermediate data of each page which is the result of the interpretation of print data, and transmits the generated intermediate data of each page to the printing control apparatus 30 within the same printing system.

The printing control apparatus 30 supplies the printing apparatus 40 with print image data, and controls the printing apparatus 40 so as to perform printing of the print image data. In this example, the printing control apparatus 30 processes intermediate data of each page received from the interpreter 20 and generates print image data of each page. The print image data is data in which the image of each page of an object to be printed is represented in a format capable of being handled by the printing apparatus 40 such as, for example, a raster format. Further, the printing control apparatus 30 may have an imposition function. The imposition function is a function for assigning plural page (logical pages) represented by PDL data (thus intermediate data) to one page (physical page) of a print recording medium. For example, when two logical pages are imposed to one physical page, print image data is obtained in which images of two logical pages are arranged on one physical page. In addition, for a conversion process or an imposition from the intermediate data to the print image data, schemes in the related art may be used, and thus the description thereof will be omitted here. The printing control apparatus 30 supplies the printing apparatus 40 with print image data of each page generated so as to be printed.

The printing apparatus 40 receives print image data supplied from the printing control apparatus 30, and prints an image represented by the print image data on a recording medium such as a sheet.

In the example of FIG. 1, while the combination of the management apparatus 10, the interpreter 20 and the printing control apparatus 30 for configuring the printing system may be changed, the printing control apparatus 30 and the printing apparatus 40 are associated one-to-one. This is because the printing control apparatus 30 and the printing apparatus 40 are connected by a high-speed interface capable of high-speed data transfer for high speed printing of print image data having a large amount of data. In this example, when the printing control apparatus 30 to be incorporated into the printing system is determined, the printing apparatus 40 to be incorporated into the printing system is automatically determined. In contrast, the management apparatus 10, the interpreter 20 and the printing control apparatus 30 are connected by a data communication network such as a typical local area network, and the combination may be flexibly changed.

As another example, a system configuration is also possible in which the printing apparatus 40 is connected to a data communication network and print image data is received from the corresponding printing control apparatus 30 through the network. In this case, the printing apparatus 40 to be incorporated into the printing system may be selected regardless of the printing control apparatus 30.

Further, even when the printing control apparatus 30 and the printing apparatus 40 are connected in a fixed manner, the fixed connection relationship is not limited to one-to-one. For example, one printing control apparatus 30 may be connected to plural printing apparatuses 40 so as to control the plural printing apparatuses 40. Further, a configuration is considered in which plural printing control apparatuses 30 are connected to one printing apparatus 40, such as a configuration in which a printing control apparatus 30 that generates print image data for a front side and a printing control apparatus 30 that generates print image data for a rear side are connected to one printing apparatus 40 capable of performing duplex printing on continuous form paper.

Hereinafter, for ease of description, a case where the printing control apparatus 30 and the printing apparatus 40 have the one-to-one fixed connection relationship will be described as an example.

Figure 2:
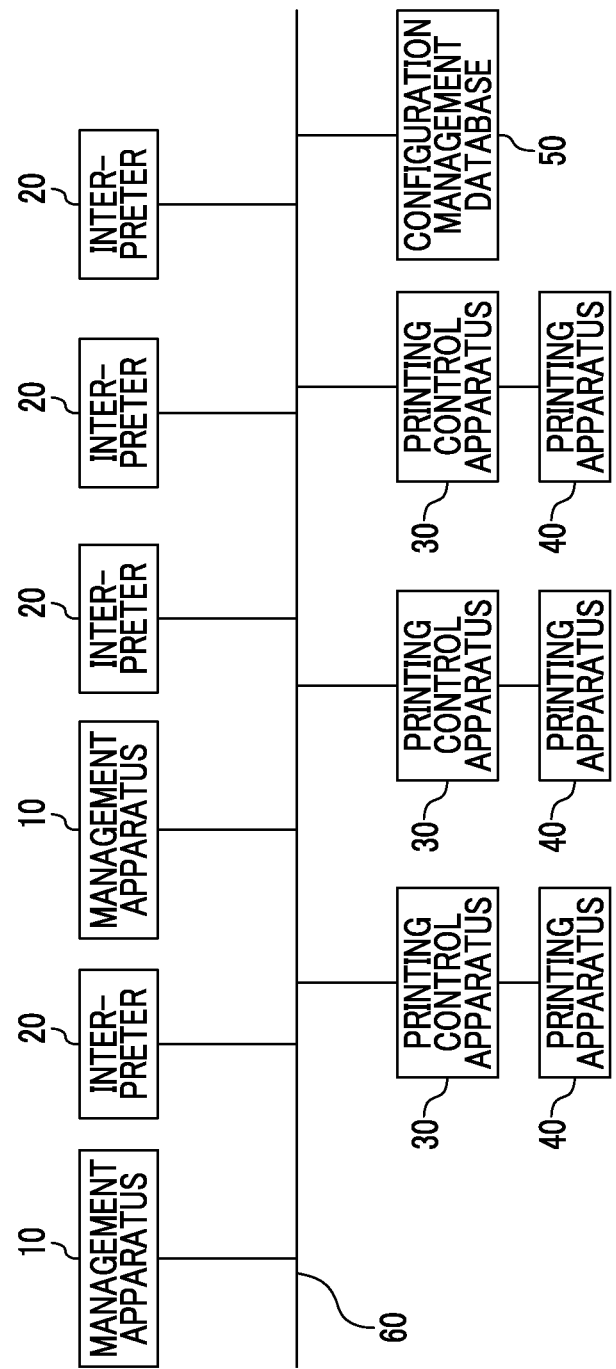
FIG. 2 is a diagram showing an example of a configuration of the printing system to which the control of the exemplary embodiment is applied.

The printing apparatus 40 among components shown in FIG. 1 needs hardware for performing printing on a physical medium, other than a computer that performs control. In contrast, the management apparatus 10, the interpreter 20 and the printing control apparatus 30 may perform a data process and may exist respectively as logically different modules. There are many variations in the physical implementation of the management apparatus 10, the interpreter 20 and the printing control apparatus 30. For example, as shown in FIG. 2, the management apparatus 10, the interpreter 20 and the printing control apparatus 30 may be installed in respective different computers connected to a data communication network 60. Further, by one computer executing plural processes representing functions of the apparatuses of same type (for example, large number of interpreters 20), the computer may be caused to function as plural apparatuses of the same type. Further, by one computer executing the processes of plural apparatuses of different types (for example, a set of the management apparatus 10 and the interpreter 20, a set of the management apparatus, the interpreter 20 and the printing control apparatus 30, or the like), the computer may be caused to function as plural apparatuses of the different types.

In addition, in the example of FIG. 2, a configuration management database 50 is connected to the data communication network 60. The configuration management database 50 is a database for managing information regarding respective units (components) included in the super system and information of a printing system configured in the super system. An example of apparatus management information and printing system management information which are stored in the configuration management database 50 is shown in FIGS. 3 and 4.

As shown in FIG. 3, the apparatus management information includes information regarding apparatus IDs, apparatus types, and addresses for communication for respective apparatuses (the management apparatus 10, the interpreter 20 and the printing control apparatus 30) connected to the data communication network 60 within the super system. The apparatus IDs are identification information for uniquely identifying respective apparatuses in the super system. The apparatus types are information as to which one of three types of the management apparatus, the interpreter, and the printing control apparatus the respective apparatuses are. The addresses for communication are addresses of respective apparatuses on the data communication network 60, and when respective apparatuses communicate with each other, the apparatuses of a transmission source and a transmission destination are represented by the addresses for communication. In the illustrated example, although an Internet Protocol (IP) address is used as the address for communication, an address of another type may be used. Further, the example of FIG. 3 corresponds to an example of FIG. 2 in which respective apparatuses are implemented in separate computers, and the addresses for communication of respective apparatuses are different from each other. As another example, when plural apparatuses are installed in one computer on the communication network 60, the apparatus IDs have separate values for the plural apparatuses; however, the address for communication is same.

The printing system management information shown in FIG. 4 contains a system ID which is identification information for uniquely identifying a system, and an apparatus ID list of the management apparatus, the interpreter, and the printing control apparatus configuring the system, for each configured printing system. In one printing system, while only one management apparatus 10 is included, plural respective interpreters 20 and printing control apparatuses 30 are included.

Each apparatus (the management apparatus 10, the interpreter 20, and the printing control apparatus 30) included in the super system holds an apparatus ID of its own and information of an apparatus type. Further, each apparatus specifies the address for communication of an apparatus with which the apparatus communicates for the print process by referring to the printing system management information of the configuration management database 50, and performs communication for exchanging data or the like using the address for communication. Further, instead of each apparatus referring to the configuration management database 50, since each apparatus is notified of information stored in the configuration management database 50 from time to time, each apparatus may always hold the latest apparatus management information and printing system management information.

Although in the example of FIG. 2, the configuration management database 50 is provided as an independent apparatus on the data communication network 60, instead thereof, a certain apparatus such as the management apparatus 10 on the data communication network 60 may serve a role of the configuration management database 50.

An example of a process flow of a print job according to the printing system will be described with reference to FIG. 5. In the example of FIG. 5, a printing system 80 is configured with one management apparatus 10, two interpreters 20, and one printing control apparatus 30 (and printing apparatus 40).

(1) The management apparatus 10 receives a print job including PDL data from a client 70. The PDL data of the received print job is held in the management apparatus 10 as an input job 100, and (2) is transferred to two interpreters 20, respectively. One reason why the entire input job 100 is transferred to each interpreter 20 is for considering a case where the input job 100 is described in the page dependent PDL. Since an instruction for a certain page also affects the print images of other subsequent pages in a case of the page dependent PDL, even when the interpreter 20 generates only intermediate data of some pages of the input job 100, it is necessary to interpret the entire input job 100 from the beginning in order to generate the intermediate data correctly. On the contrary, when the input job 100 is described in the page independent PDL, each interpreter 20 may supply only PDL data of a page of the input job 100, intermediate data of which the interpreter 20 is to generate. Further, another reason why the entire input job 100 is transferred to each interpreter 20 in the example in FIG. 5 is that once the entire input job 100 is transferred, even when the page to be assigned (in other words, the page of which intermediate data is to be generated) to the interpreter 20 changes from the predetermined page for any reason thereafter, it is easy to cope with that situation. In other words, the management apparatus 10 may notify the interpreter 20 of only the page number to be assigned, and when the object to be assigned changes, notification of only the page number to be assigned after the change may be given. In contrast, in a case of a scheme where only PDL data of the page to be assigned is provided to the interpreter 20, when there is a change in the predetermined assignment, the PDL data of the page to be assigned after the change is required to be transmitted to the interpreter 20.

(3) The management apparatus 10 instructs the two interpreters 20 to generate intermediate data of respective separate pages. In the illustrated example, the management apparatus 10 instructs one interpreter 20 to generate intermediate data of an odd page, and the other interpreter 20 to generate intermediate data of an even page. For example, first, the management apparatus 10 instructs one interpreter 20 to generate intermediate data of the first page, and the other interpreter 20 to generate intermediate data of the second page, and subsequently instructs generation of intermediate data of the third and fourth pages, the fifth and sixth pages, . . . , respectively. (4) By such parallel instructions, two interpreters 20 perform the generation of intermediate data of two pages in parallel. Here, when the input job 100 is described in the page dependent PDL, each interpreter 20 interprets the input job 100 from the beginning in order, and changes the internal state according to the interpretation. Then, each interpreter 20 generates intermediate data for the page instructed by the management apparatus 10, according to the internal state. The interpreter 20 includes an intermediate data accumulation unit 22 that accumulates the generated intermediate data and a management table 24 that records information of the page of which the generation of intermediate data is completed. The interpreter 20 stores the intermediate data of the generated page in the intermediate data accumulation unit 22, and adds information specifying the page as information indicating the generated page to the management table 24. The information specifying the page is, for example, a set of identification information of the input job 100 and the page number of the page in the input job 100.

When a timing of a print out is reached, the intermediate data of each page accumulated in the intermediate data accumulation unit 22 is transferred to the printing control apparatus 30 in order. (5) After the printing control apparatus 30 imposes intermediate data of each received page on a physical page according to an imposition condition designated from the user, it rasterizes (that is, conversion into a raster image) the intermediate data, and controls the printing apparatus 40 to print the print image data obtained by the rasterization. In the illustrated example, the logical pages of two pages are imposed for the physical page of one page.

In the printing system 80, a case where at least one of the printing control apparatus 30 and the printing apparatus 40 in the printing system 80 is not capable to perform a normal operation due to a failure may be considered.

For example, as shown in (A) of FIG. 6, in a printing system 80-1 that includes a set of printing control apparatus 30-1 and a printing apparatus 40-1, it is assumed that while a print output of a print job is being performed, at least one of the printing control apparatus 30-1 and the printing apparatus 40-1 fails. In the following description, it is assumed that the printing system 80-1 (a management apparatus 10-1, an interpreter 20-1, . . . , and the printing apparatus 40-1) represents a failed printing system or a component thereof and a printing system 80-2 (a management apparatus 10-2, . . . , and a printing apparatus 40-2) represents a normal printing system or a component thereof.

In such a case, if any countermeasure is not taken, as shown in (B) of FIG. 6, (1) printing in the printing control apparatus 30-1 and the printing apparatus 40-1 is suspended during thereof. When the printing apparatus 40-1 fails, it is natural that the printing is suspended during thereof, and similarly, when the printing control apparatus 30-1 that supplies print image data to the printing apparatus 40-1 fails, the printing is also suspended. (2) As a result, the entire printing system 80-1 enters an unusable state. In such a case, (3) the user inputs again the job executed up to then to the printing system 80-2 that is not currently used in the same super system from the client 70, (4) sequentially performs interpretation from the first page again, and (5) performs printing from the first page again. It may be considered that the printing is repeated again from a subsequent page of the printed pages in the suspended printing system 80-1, but in many cases, since an operation of computing the printed pages is complicated, the printing may be performed again from the beginning in many cases. Further, in this case, the intermediate data that is already generated in the interpreter 20-1 that is normally operated is discarded.

With respect to these problems, in the exemplary embodiment, as shown in (A) of FIG. 7, when the printing control apparatus 30-1 or the printing apparatus 40-1 in the printing system 80-1 fails, the management apparatus 10-1 detects the failure.

As shown in (B) of FIG. 7, in this case, similarly, (1) the printing in the printing system 80-1 is temporarily suspended.

(2) Here, in the exemplary embodiment, the printing system 80-1 is not completely suspended, and the management apparatus 10-1 performs a relief process during the time. In the relief process, the failed printing control apparatus 30-1 and the printing apparatus 40-1 are at least temporarily separated from the printing system 80-1. Further, the pair of the printing control apparatus 30-2 and the printing apparatus 40-2 is borrowed from the other printing system 80-2 in the super system, and then is temporarily assembled in the printing system 80-1. (3) In this flow, it is not necessary to input again the print job data from the client to the printing system as in a case where the printing is performed again from the beginning in the other printing system 80-2. (4) If the printing control apparatus 30-2 and the printing apparatus 40-2 are borrowed in this way, the intermediate data that is the interpretation result of the plural interpreters 20 in the printing system 80-1 is transmitted to the borrowed printing control apparatus 30-2. (5) The printing control apparatus 30-2 generates print image data from the received intermediate data, and supplies the print image data to the printing apparatus 40-2. Thus, the printing is started again from a subsequent page without inputting the print job to the printing system 80-2 again.

In order to realize the above-described processes, the management apparatus 10-1 includes a functional module shown in FIG. 8, for example.

An assignment unit 12 performs a process of assigning a page of a print job that is being executed to each interpreter 20-1 in the printing system 80-1 for interpretation. When a failure occurs in the printing control apparatus 30-1 or the printing apparatus 40-1 in the printing system 80-1, the failure detection unit 14 detects the failure occurrence. As a method of detecting the failure occurrence, a specific example will be described later. When the failure detection unit 14 detects the failure of the printing control apparatus 30-1 or the printing apparatus 40-1, a failure handling and processing unit 16 performs a relief process of continuing the print job in response to the failure. That is, the failure handling and processing unit 16 separates the printing control apparatus 30-1 and the printing apparatus 40-1 from the printing system 80, and requests the management apparatus 10-2 of the printing system 80-2 to lend the printing control apparatus 30-2 and the printing apparatus 40-2. If the management apparatus 10-2 approves lending of the printing control apparatus 30-2 and the printing apparatus 40-2 in response to the lending request, the failure handling and processing unit 16 assembles the printing control apparatus 30-2 and the printing apparatus 40-2 in the printing system 80-1. Then, if an output of interpretation result data is instructed to the interpreter 20-1 in the printing system 80-1, the interpreter 20-1 transfers the interpretation result data to the printing control apparatus 30-2 that is newly assembled in the printing system 80-1. Thus, the interpretation result data generated by the interpreter 20-1 is printed by the borrowed printing control apparatus 30-2 and printing apparatus 40-2. When receiving a lending request from another printing system 80, a lending processing section 18 performs a lending process of the printing control apparatus 30-1 and the printing apparatus 40-1 in its own system in response to the request, or assembles the printing control apparatus 30-1 and the printing apparatus 40-1 returned from the printing system that is a borrower in its own system again.

Hereinbefore, when the printing control apparatus 30 or the printing apparatus 40 in the printing system 80 fails, the outline of the control of the exemplary embodiment has been described. Next, the control of the exemplary embodiment will be described in more detail with reference to FIGS. 9 to 12.

A procedure shown in FIG. 9 is executed when detecting a failure occurs in the printing control apparatus 30 or the printing apparatus 40 in the printing system 80 under the control of the management apparatus 10. A method of detecting the failure is approximately divided into two types.

One type corresponds to a case where the management apparatus 10 is not capable to communicate with the (failed) printing control apparatus 30. As an example of this case, there is a case where the printing control apparatus 30 is crashed, a case where power supply is cut off, or a case where a failure occurs in a network that connects the management apparatus 10 and the printing control apparatus 30. Since the management apparatus 10-1 and the printing control apparatus 30-1 in the same printing system 80-1 perform communication for an inquiry or response therebetween without cease for execution of the print job, for example, it is determined that the printing control apparatus 30-1 fails when the response to the inquiry is not returned from the printing control apparatus 30-1.

As another type of the failure detection, there is a case where a control section in the printing control apparatus 30 detects a logical or physical failure in the printing control apparatus 30 and a failure in the printing apparatus 40 and notifies the management apparatus 10 of the failures. As the logical failure, for example, there is a damage of the management information in the printing control apparatus 30, a failure of a program that is being executed, or the like. As the physical failure, for example, there is a failure of a physical module such as a hard disk provided in the printing control apparatus 30. In this type, the management apparatus 10 may communicate with the printing control apparatus 30, and thus, the printing control apparatus 30 notifies the management apparatus 10 of the fact that the failure occurs inside the printing control apparatus 30 or the connected printing apparatus 40, so that the management apparatus 10 detects that the failure occurs in the printing control apparatus 30 or the printing apparatus 40. When a control section in the printing control apparatus 30 detects the failure of respective components of the printing control apparatus 30 or the failure of the printing apparatus 40, after the failure is notified to the management apparatus 10, the control section may cut off power supply to any one of the printing control apparatus 30 and the printing apparatus 40 where the failure occurs or to both of the printing control apparatus 30 and the printing apparatus 40. Thus, when a user arrives at the position of the printing control apparatus 30 and the printing apparatus 40 to repair the failed component, since the power supply is already cut off, it is possible to quickly start the repair.

Hereinafter, a processing procedure in FIG. 9 will be described using the system shown in (A) of FIG. 7 and (B) of FIG. 7 as an example. When detecting the occurrence of failure occurs in the printing control apparatus 30-1 or the printing apparatus 40-1 in the printing system 80-1 while a certain print job is being executed, the management apparatus 10-1 in the printing system 80-1 stops reception of a new job (S10). Then, until the failure is processed, the client 70 is not capable to input the print job to the printing system 80-1. Then, it is determined whether a job during print output is present (S12). If the job during print output is not present, the process described in FIG. 9 is finished without performing any operation. In this case, the printing system 80-1 enters a suspended state due to the failure, and waits for repairing of the failure. Even when the job during print output is not present, when the reception is already present (but when the print output is not yet started), this case may be handled in the same way (to be described later) as in the case where the job during print output is present.

When the determination result in S12 is Yes (if the job during print output is present), the management apparatus 10-1 stops the printout of the job, and makes an inquiry to the user who has input the print job whether to continue the printing in the printing system 80-1 (S14). This inquiry may be performed by displaying an inquiry screen 200 shown in FIG. 10, for example, in a display apparatus connected to the management apparatus 10-1 or the client 70. The inquiry screen 200 includes an identification title of a job that is being executed, and a message indicating that the printing control apparatus 30-1 or the printing apparatus 40-1 fails. Further, on the inquiry screen 200, the number of pages that are already output in the print job and information about the number of pages that are not output are shown. This information is used to as data for determining whether the user continues the printing in the printing system 80-1 or the user restarts the printing from the beginning in another printing system 80 (for example, the printing system 80-2). As the data for the determination, the ratio of the number of output pages to the number of the entire pages of the print job may be used, for example, in addition to an example shown in FIG. 10. When the user does not select the continuous process in the printing system 80-1 (when the determination result in S14 is No) with respect to the inquiry, the management apparatus 10-1 stops the execution of the print job and finishes the process in FIG. 9.

When the user selects the continuous process in the printing apparatus 80-1 with respect to the inquiry (when the determination result in S14 is Yes), the management apparatus 10-1 requests the management apparatus 10-2 in another printing system (for example, the printing system 80-2) to lend the printing control apparatus 30-2 and the printing apparatus 40-2 present in the super system (S16). The management apparatus 10-1 makes reference to the printing system management information in the configuration management database 50, specifies the management apparatus 10-2 of the other printing system 80-2, obtains a communication address of the specified management apparatus 10-2 from apparatus management information in the same database, and transmits the lending request to the management apparatus 10-2 of the other system using the communication address. In this example, it is assumed that the management apparatus 10-2 of the printing system 80-2 that receives the lending request lends, immediately if a job that is being executed is not present, or immediately after the execution of the job is finished if the job that is being executed is present, the printing control apparatus 30-2 and the printing apparatus 40-2 in the printing system 80-2.

If the management apparatus 10-1 that makes the lending request receives a notification indicating a lending approval from the management apparatus 10-2 that is the other party of the request (S18), the management apparatus 10-1 changes the configuration of the printing system 80-1 under the management of the management apparatus 10-1 (S20). That is, the management apparatus 10-1 deletes apparatus IDs of the failed printing control apparatus 30-1 and printing apparatus 40-1 from the management information on the printing system 80-1 in the configuration management database 50, and instead, adds apparatus IDs of the printing control apparatus 30-2 and the printing apparatus 40-2 included in the message of the lending approval to the management information. According to the configuration change, the configuration management database 50 notifies the respective apparatuses belonging to the printing system 80-1 of the management information of the printing system 80-1 after the configuration change. Thus, each interpreter 20-1 in the printing system 80-1 recognizes that an output destination of generated intermediate data is the borrowed printing control apparatus 30-2.

After the configuration change, the management apparatus 10-1 restarts a print output of the print job (S22). That is, the management apparatus 10-1 instructs each interpreter 20-1 in the printing system 80-1 to restart the supply of the interpretation result (intermediate data) to the printing control apparatus 30-2, and instructs the printing control apparatus 30-2 to restart the printing. At this point of time, since the printing control apparatus 30-2 and the printing apparatus 40-2 in the printing system 80-1 are normal apparatuses borrowed from another printing system, the print output is normally performed.

The management apparatus 10-1 continues the print output until the print output of the job determined as during printing (or as being already received) in S12 is finished (S24). Further, if the print output is finished, the management apparatus 10-1 makes an inquiry to the user whether to return the system configuration changed in S20 to the original (S26). In this inquiry, for example, an inquiry screen 210 shown in FIG. 11 is displayed in the display apparatus connected to the management apparatus 10-1 or the client 70. On this inquiry screen, a message indicating that the output of the print job during being executed is completed and an inquiry message inquiring whether to perform the return of the system configuration are displayed. When the user performs an instruction indicating that the configuration is not to be returned to the original with respect to the inquiry, the management apparatus 10-1 causes the printing system 80-1 to enter a stop state, and finishes the process described in FIG. 9. Then, the repair of the failed printing control apparatus 30-1 and printing apparatus 40-1 is performed, and then, the printing system 80-1 is restarted as necessary. Here, the configuration of the printing system 80-1 may be restored to the original, or the system configuration changed in S20 may be used as it is for the restart.

When the user selects the message indicating that the system configuration is returned to the original in S26 (when the determination result is Yes), the management apparatus 10-1 separates the borrowed printing control apparatus 30-2 and printing apparatus 40-2 from the printing system 80-1 (that is, deletes the borrowed printing control apparatus 30-2 and printing apparatus 40-2 from an entry of the corresponding system of the printing system management information in the configuration management database 50), and assembles the failed printing control apparatus 30-1 and printing apparatus 40-1 separated in S20 in the printing system 80-1 again. Further, the management apparatus 10-1 notifies the management apparatus 10-2 of the printing system 80-2 that is the lender that lends the printing control apparatus 30-2 and the printing apparatus 40-2 in S18 that the printing control apparatus 30-2 and the printing apparatus 40-2 separated in S28 are returned (S30). Thus, the printing system 80-2 that is the lender is returned to the system configuration before the lending. Then, the repair of the failed printing control apparatus 30-1 and the printing apparatus 40-1 is performed, and then, the printing system 80-1 is restarted as necessary.

Hereinbefore, the processing procedure of the management apparatus 10 of the printing system 80 in which the failure occurs in the printing control apparatus 30 or the printing apparatus 40 has been described with reference to FIG. 9. Next, a processing procedure of the management apparatus 10 of the printing system 80 that lends the printing control apparatus 30 or the printing apparatus 40 will be described with reference to FIG. 12.

The processing procedure in FIG. 12 is started if the lending request (S16 in FIG. 9) is received from the management apparatus 10-1 of the printing system 80-1 in which the failure occurs. In this case, the management apparatus 10-2 determines whether the job during print output is present (S40). If the job during print output is present, the management apparatus 10-2 waits until the print output of the job is completed (S42). If the print output is completed, the management apparatus 10-2 replies a message indicating the lending approval (S44). This reply may include information about apparatus IDs and apparatus types of the printing control apparatus 30-2 and the printing apparatus 40-2 to be lent. When it is determined that the job during print output is not present in S40, the procedure skips S42 and proceeds to S44 to send the reply of the lending approval. Further, the management apparatus 10-2 executes a configuration change of separating the printing control apparatus 30-2 and the printing apparatus 40-2 to be lent from the printing system 80-2 in parallel with the reply of the lending approval (S46).

After the configuration change, the management apparatus 10-2 transits the printing system 80-2 to a minimal mode. In the minimal mode, when receiving a new print job from the client 70, the management apparatus 10-2 performs the interpretation process using the interpreter 20-2 for the print job, but holds the print output. The intermediate data that is the interpretation result is spooled in the interpreter 20-2, and is print-output after the lent printing control apparatus 30-2 and the printing apparatus 40-2 are returned.

After transition to the minimal mode, the management apparatus 10-2 waits until the return notification (S30 in FIG. 9) comes from the management apparatus 10-1 of the printing system 80-1 that is the borrower. If the return notification is received, the management apparatus 10-2 executes the configuration change of assembling the lent printing control apparatus 30-2 and the printing apparatus 40-2 in its own system again (S50), and returns from the minimal mode to a normal mode. In the normal mode, the management apparatus 10-2 executes the print output for the job of which the print output is instructed in the state of being interpreted. Further, if there are a job already received when the lending request is received, of which the printing is not yet started, and a job received in the minimal mode, the management apparatus 10-2 performs the print output of the jobs (S52). That is, the management apparatus 10-2 instructs each interpreter 20-2 to transfer the spooled intermediate data of the job to the returned printing control apparatus 30-2.

In the processes shown in FIGS. 9 and 12, the management apparatus 10-2 that receives the lending request necessarily performs the lending of the printing control apparatus 30-2 and the printing apparatus 40-2, but this configuration is only an example. Instead, the management apparatus 10-2 that receives the lending request may reject the lending request. For example, it is possible to set whether to approve the lending of the printing control apparatus 30 and the printing apparatus 40 for each printing system 80. In this case, the management apparatus 10 of the printing system 80 set so that the lending is not approved replies a message indicating rejection of the lending request from the management apparatus 10 of the other printing system 80. Further, instead of performing the fixed setting for each printing system 80 in this way, when the user continuously executes plural jobs in a certain printing system 80, the user may designate so that the lending of the printing control apparatus 30 and the printing apparatus 40 is not approved until the print output of the plural jobs is completed. The management apparatus 10 of which the lending request is rejected from a certain printing system 80 may make the request to the management apparatus 10 of another printing system 80.

The respective management apparatuses 10 included in the super system may execute both of the processes in FIGS. 9 and 12, and thus execute the procedure in FIG. 9 when a failure occurs in its own system, and executes the procedure in FIG. 12 when a lending request is received from another system.

Hereinbefore, the exemplary embodiments of the invention have been described. The exemplary embodiments are only examples of the configuration according to the invention. Various modifications may be made in the scope of the invention.

For example, in the above-describe exemplary embodiments, since the printing control apparatus 30 and the printing apparatus 40 is a pair connected by a dedicated interface, the pair of the printing control apparatus 30 and the printing apparatus 40 is integrally lent or borrowed, but this is only an example. When the printing apparatus 40 is also connected to the data communication network 60 (see FIG. 2), it is possible to separately lend or borrow the printing control apparatus 30 and the printing apparatus 40, respectively. For example, when a failure occurs in the printing apparatus 40 of a certain printing system 80 and a failure does not occur in the printing control apparatus 30, the printing system 80 may borrow only the printing apparatus 40 (here, the apparatus connected to the data communication network 60) from another printing system 80. Similarly, when a failure occurs in the printing control apparatus 30 and a failure does not occur in the printing apparatus 40, the printing system 80 may borrow only the printing control apparatus 30 from another printing system 80. When the printing apparatus 40 is also connected to the data communication network 60 in the same printing system 80, the failure of the printing apparatus 40 may be detected by any one of the printing control apparatus 30 and the management apparatus 10 in the same printing system 80. When the printing control apparatus 30 detects the failure, the detected failure is notified to the management apparatus 10. A method of detecting the failure of the printing apparatus 40 may be the same as the failure detection method in the above-described exemplary embodiments.

Further, for example, in the above-described exemplary embodiments, the interpreter 20 converts the PDL data into the intermediate data and the printing control apparatus 30 converts the intermediate data into the print image data of the raster form or the like, but the invention is not limited thereto. For example, the interpreter 20 may convert the PDL data into the intermediate data and the printing control apparatus 30 may arrange the print image data transferred from one or more interpreters 20 in the printing order or may fit the print image data, to supply the result to the printing apparatus 40.

Further, in the above description, whenever the failure occurs, the management apparatus makes an inquiry to the user who inputs the print job whether to continue the print job (see S14 in FIG. 9). However, in a case where the failure occurs in the printing system 80 when the user inputs the print job, the management apparatus may preset whether to borrow the printing control apparatus 30 and the printing apparatus 40 in another printing system 80 to continue the print job. According to this presetting, for example, even though the failure occurs when the user is absent, it is possible to execute the preset process without waiting for confirmation of the user, and thus, it is possible to perform a fast failure relief process. When there are plural other printing systems capable of performing the lending are present when the failure occurs, the user may preferentially select and set a printing system in which the user desires to continue the print job.

Further, although in the foregoing examples, the management apparatus 10 assigns corresponding portions to the plural interpreters 20 within the same printing system 80 in units of pages, the assignment may be performed, for example, in a band and or tile other than the page. The band is a belt-shaped region obtained by equally dividing a page with a straight line parallel to a main scanning line during the print process of the printing apparatus 40, and the tile is a rectangular region obtained by equally dividing a page vertically and horizontally with straight lines which are respectively parallel to a main scanning line and a sub scanning line of the print process.

For example, the management apparatus 10, the interpreter 20, and the printing control apparatus 30 which are exemplified above are realized by causing a general-purpose computer to execute a program representing the processes of respective functional modules of the apparatuses. The computer referred to here has a circuit configuration as hardware, in which a microprocessor such as a CPU, a memory (primary storage) such as a random access memory (RAM) and a read-only memory (ROM), a secondary storage controller controlling a secondary storage such as a hard disk drive (HDD), a solid-state drive (SDD), and a flash memory, various input and output (I/O) interfaces, a network interface performing the control for connection with a wireless or wired network, and the like are connected with each other through, for example, a bus. Further, a disk drive for reading and/or writing for a portable disk recording medium such as a CD, a DVD and a Blu-ray disc through, for example, an I/O interface, a memory reader and writer for reading and/or writing for a portable non-volatile recording medium of various standards such as flash memory, or the like may be connected to the bus. A program in which the processing contents of the respective functional modules exemplified above have been described is held in the secondary storage apparatus such as a flash memory through a recording medium such as a CD or DVD or a communication unit such as a network and installed into a computer. The functional module group exemplified above may be realized by a program stored in the secondary storage apparatus being read to a RAM and being executed by a microprocessor such as a CPU. Further, some of the functions of the management apparatus 10, the interpreter 20, and the printing control apparatus 30 may be implemented as a hardware circuit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print management apparatus comprising:
    a failure detector that detects a failure of a printing control apparatus and a printing apparatus in a printing system;
    a printing continuation control unit that performs a control for requesting, when the failure detector detects the failure of any one of the printing control apparatus and the printing apparatus, another printing system to lend an apparatus corresponding to the apparatus of which the failure is detected among the printing control apparatus and the printing apparatus, and for continuing, when the apparatus that is a request target is lent in response to the request, printing by the lent apparatus instead of the apparatus of which the failure is detected;
    a lending unit that lends, when receiving a lending request of at least one of the printing control apparatus and the printing apparatus from another printing system, the apparatus that is a request target among the printing control apparatus and the printing apparatus under management of the print management apparatus, after a print output of print data is completed when the print output of the print data is being executed using the printing control apparatus and the printing apparatus under management of the print management apparatus; and
    a lending processing control unit that performs a control for receiving print data from a client, for performing, in the printing system of the print management apparatus, an interpretation process and for storing interpretation result data during a period between a time when the lending unit lends the apparatus that is the request target in response to the lending request and a time when the apparatus that is the request target is returned, and for performing a print output of the interpretation result data stored during the period using the returned apparatus when the apparatus that is the request target is returned,
    wherein the interpretation result data is intermediate data generated by the interpretation process as a result of interpreting page description language data, and having a format different from a format of the page description language data,
    wherein the print output of the stored interpretation result data is performed after a configuration change in which the request target is returned and assembled in the printing system of the print management apparatus, and
    wherein the lending unit lends the apparatus that is the requested target to perform a print output of other interpretation result data generated as intermediate data in the another printing system as a result of interpreting other page description language data.

2. The print management apparatus according to claim 1, wherein the printing continuation control unit determines the another printing system that is a target of the lending request of the apparatus with reference to a configuration management database that stores printing system management information for specifying respective components of the plurality of printing systems and apparatus management information indicating attributes of the components.

3. The print management apparatus according to claim 2, wherein when the apparatus that is the request target is lent by the another printing system, the printing continuation control unit updates the printing system management information relating to the printing system, stored in the configuration management database.

4. The print management apparatus according to claim 1, wherein the printing continuation control unit receives, from a configuration management database that stores printing system management information for specifying respective components of the plurality of printing systems and apparatus management information indicating attributes of the components, a notification of the printing system management information and the apparatus management information, and determines the another printing system that is a target of the lending request of the apparatus.

5. A non-transitory recording medium that stores a program that causes a computer to function as:
a failure detector that detects a failure of a printing control apparatus and a printing apparatus in a printing system;
a printing continuation control unit that performs a control for requesting, when the failure detector detects the failure of any one of the printing control apparatus and the printing apparatus, another printing system to lend an apparatus corresponding to the apparatus of which the failure is detected among the printing control apparatus and the printing apparatus, and for continuing, when the apparatus that is a request target is lent in response to the request, printing by the lent apparatus instead of the apparatus of which the failure is detected;
a lending unit that lends, when receiving a lending request of at least one of the printing control apparatus and the printing apparatus from another printing system, the apparatus that is a request target among the printing control apparatus and the printing apparatus under management of the print management apparatus, after a print output of print data is completed when the print output of the print data is being executed using the printing control apparatus and the printing apparatus under management of the print management apparatus; and
a lending processing control unit that performs a control for receiving print data from a client, for performing, in the printing system of the print management apparatus, an interpretation process and for storing interpretation result data during a period between a time when the lending unit lends the apparatus that is the request target in response to the lending request and a time when the apparatus that is the request target is returned, and for performing a print output of the interpretation result data stored during the period using the returned apparatus when the apparatus that is the request target is returned,
wherein the interpretation result data is intermediate data generated by the interpretation process as a result of interpreting page description language data, and having a format different from a format of the page description language data,
wherein the print output of the stored interpretation result data is performed after a configuration change in which the request target is returned and assembled in the printing system of the print management apparatus, and
wherein the lending unit lends the apparatus that is the requested target to perform a print output of other interpretation result data generated as intermediate data in the another printing system as a result of interpreting other page description language data.

6. The non-transitory recording medium according to claim 5, wherein the printing continuation control unit determines the another printing system that is a target of the lending request of the apparatus with reference to a configuration management database that stores printing system management information for specifying respective components of the plurality of printing systems and apparatus management information indicating attributes of the components.

7. The non-transitory recording medium according to claim 6, wherein when the apparatus that is the request target is lent by the another printing system, the printing continuation control unit updates the printing system management information relating to the printing system, stored in the configuration management database.

8. The non-transitory recording medium according to claim 5, wherein the printing continuation control unit receives, from a configuration management database that stores printing system management information for specifying respective components of the plurality of printing systems and apparatus management information indicating attributes of the components, a notification of the printing system management information and the apparatus management information, and determines the another printing system that is a target of the lending request of the apparatus.

9. A printing system comprising:
a printing apparatus that prints print image data;
a printing control apparatus that supplies the print image data to the printing apparatus and performs a control for executing printing; and
a print management apparatus,
wherein the print management apparatus includes a failure detector that detects a failure of a printing control apparatus and a printing apparatus;
a printing continuation control unit that performs a control for requesting, when the failure detector detects the failure of any one of the printing control apparatus and the printing apparatus, another printing system to lend an apparatus corresponding to the apparatus of which the failure is detected among the printing control apparatus and the printing apparatus, and for continuing, when the apparatus that is a request target is lent in response to the request, printing by the lent apparatus instead of the apparatus of which the failure is detected;
a lending unit that lends, when receiving a lending request of at least one of the printing control apparatus and the printing apparatus from another printing system, the apparatus that is a request target among the printing control apparatus and the printing apparatus under management of the print management apparatus, after a print output of print data is completed when the print output of the print data is being executed using the printing control apparatus and the printing apparatus under management of the print management apparatus; and
a lending processing control unit that performs a control for receiving print data from a client, for performing, in the printing system of the print management apparatus, an interpretation process and for storing interpretation result data during a period between a time when the lending unit lends the apparatus that is the request target in response to the lending request and a time when the apparatus that is the request target is returned, and for performing a print output of the interpretation result data stored during the period using the returned apparatus when the apparatus that is the request target is returned, wherein the interpretation result data is intermediate data generated by the interpretation process as a result of interpreting page description language data, and having a format different from a format of the page description language data, wherein the print output of the stored interpretation result data is performed after a configuration change in which the request target is returned and assembled in the printing system of the print management apparatus, and wherein the lending unit lends the apparatus that is the requested target to perform a print output of other interpretation result data generated as intermediate data in the another printing system as a result of interpreting other page description language data.

10. The printing system according to claim 9, wherein the printing continuation control unit determines the another printing system that is a target of the lending request of the apparatus with reference to a configuration management database that stores printing system management information for specifying respective components of the plurality of printing systems and apparatus management information indicating attributes of the components.

11. The printing system according to claim 10, wherein when the apparatus that is the request target is lent by the another printing system, the printing continuation control unit updates the printing system management information relating to the printing system, stored in the configuration management database.

12. The printing system according to claim 9, wherein the printing continuation control unit receives, from a configuration management database that stores printing system management information for specifying respective components of the plurality of printing systems and apparatus management information indicating attributes of the components, a notification of the printing system management information and the apparatus management information, and determines the another printing system that is a target of the lending request of the apparatus.

\* \* \* \* \*